April 27, 1965  B. E. BLACKABY  3,180,425
COORDINATED ENGINE LOAD AND FUEL CONTROL SYSTEM
Filed Nov. 28, 1961
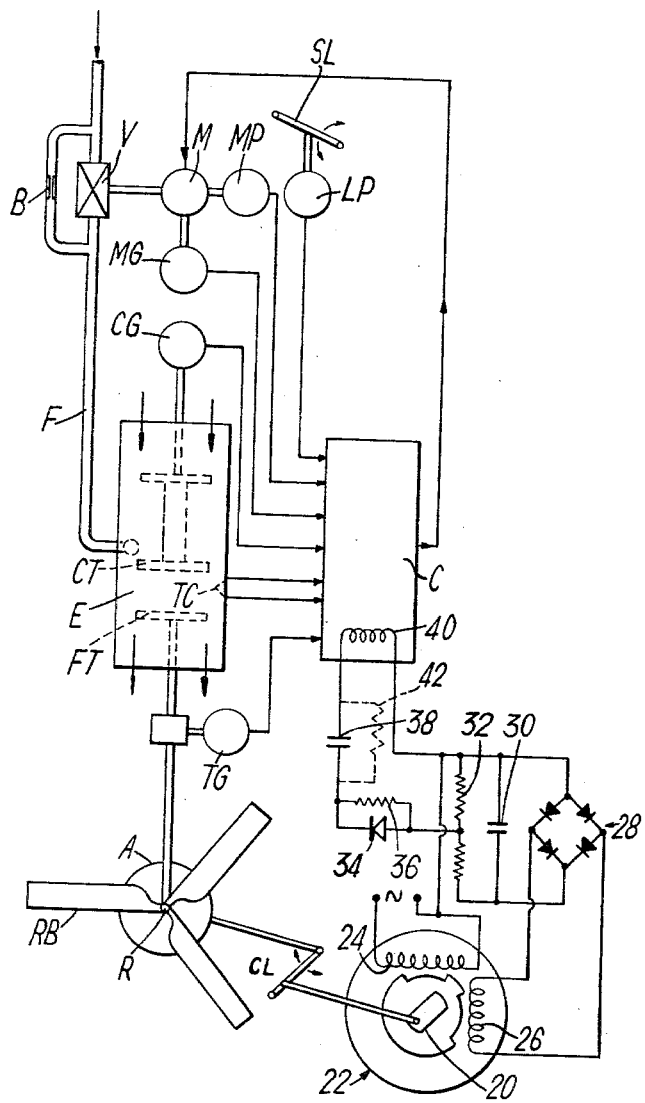
Inventor
Benjamin Edward Blackaby
By Karl W. Flocks
Attorney

United States Patent Office 3,180,425
Patented Apr. 27, 1965

3,180,425
COORDINATED ENGINE LOAD AND FUEL CONTROL SYSTEM
Benjamin E. Blackaby, Welwyn, England, assignor to The De Havilland Aircraft Company Limited
Filed Nov. 28, 1961, Ser. No. 155,311
Claims priority, application Great Britain, Dec. 22, 1960, 44,017/60
17 Claims. (Cl. 170—135.74)

This invention relates to engine fuel control systems and particularly to such a control system for an engine connected to drive a variable power-consuming device, comprising signal means to produce an electric control signal as a function of engine speed, speed setting and changes in speed setting and flow control means responsive to the electric control signal to control the magnitude and rate of change of flow of fuel supplied to the engine. Such a system is described in the specification of my co-pending patent application Serial No. 42,585, now U.S. Patent No. 3,151,450.

According to the present invention in such a control system, there is power consumption setting means to vary the setting of the power consumption of the device and means to modify the electric control signal by an amount which is a function of the rate of change of the power consumption setting.

Preferably the power consumption setting means is controlled by a manually operable member, which is conveniently angularly movable.

The manually operable member may be connected to control the output of an energised circuit the output of which is capacitatively coupled to the signal means.

In the case of an engine control system whose power speed graph has a droop characteristic, the electric control signal is also modified by an amount which is a function of the change of the power consumption setting.

In this case, the output of the energised circuit may be resistively coupled to the signal means.

Conveniently, the output is connected through a capacitor, shunted by a resistor, to a control winding of a magnetic amplifier of the governor circuit.

In order that the invention may be more clearly understood, an embodiment thereof is hereinafter particularly described, with reference to the accompanying drawing which is a schematic diagram of a rotor-driving engine control system according to the invention.

A gas turbine engine E having a free turbine FT and a compressor turbine CT is supplied with fuel through a pipe F under the control of a valve V having a by-pass bleed passage B. The valve V is controlled by a two-phase actuator motor M which drives a tacho-generator MG which provides an output signal to a computer C, which is a function of the rate of operation of the motor M. The motor M is mechanically linked to a rotary inductive pick-off MP and a further similar pick-off LP is mechanically coupled to the pilot's speed lever SL, the computer C deriving from the pick-offs MP and LP a signal which is a function of the relative angular displacements of the valve V and the pilot's speed lever SL. A thermocouple TC is exposed to inter-turbine temperature and supplies the computer C with a signal which is a function of such temperature. The free turbine FT drives a tacho-generator TG which supplies the computer C with a signal which is a function of the free turbine speed. The compressor turbine CT drives a tacho-generator CG which supplies the computer C with a signal which is a function of the compressor turbine speed. The computer C operates on the input signals thereto to produce an output signal which controls the motor M and hence the fuel supply to the engine E.

Such a system is described and claimed in the specification of my co-pending patent application Serial No. 42,585, and the engine E is connected to drive the blade-carrying rotor R of a helicopter. The rotor is a power-consuming device and the pitch of its blades RB can be varied collectively by means of an actuator A controlled by a pilot's collective pitch change lever CL. A variation in the collective pitch of the blades causes a variation in the power consumption.

Accordingly when the lever CL is moved to change collectively the pitch of the blades RB, the speed of the free turbine FT is changed, increasing or decreasing as the power consumption decreases or increases. There is a slight delay in such speed change due to the inertia of the system and there is a further slight delay in the computer C before the output signal to the motor M is changed. There is then a still further slight delay until the fuel flow is changed and the correct turbine speed again achieved.

In order to overcome the difficulties which arise from these delays, the system according to the present invention includes means for modifying the electric control signal applied to the motor M by an amount which is a function of the rate of change of setting of the lever CL.

For this purpose, the lever CL is connected to a rotor 20 of a variable inductance pick-off 22. The pick-off 22 has salient poles at right angles on which are wound two coils 24 and 26, which act as inductively coupled inductors whose mutual inductance is controlled by the angular position of the rotor 20. The inductor coil 24 is fed with alternating current and the output of the inductor coil 26 is fed to a bridge rectifier 28. A smoothing capacitor 30 is connected across the output of the rectifier 28, which is fed to a potential divider 32. A tapping is taken from the divider 32 through a rectifier 34, shunted by a resistor 36, and a capacitor 38 to a control winding 40 in a magnetic amplifier in the governor circuit of the computer C. An input signal to the control winding 40 upsets the balance of the governor circuit so that the latter produces an output signal to the fuel throttle control circuit to energise the motor M to control the valve V and alter the fuel flow.

In operation, signals indicative of the parameters of operation of the engine E are received by the computer C and a control signal is derived and used to operate the motor M to vary the fuel flow until stable conditions are reached and there is no control signal from the computer C. If then the pilot's collective pitch change lever CL is angularly moved to change the pitch for the blades RB of the helicopter rotor R, the actuator A is operated to move the blades RB to the selected pitch and the rotor 20 is angularly moved in the pick-off 22. This results in a change of signal from coil 26, rectifier 28 and potential divider 32 and this signal is differentiated by the capacitor 38 so that the resultant signal in the control winding is a rate signal which is a function of the angular velocity or rate of change of angular position of the lever CL. The signal in the control winding 40 results in an increase or decrease in fuel flow depending on whether the power consumption has been increased or decreased by the pitch change. The signal from the potential divider passes through the rectifier 34 if an increase of fuel flow is required as the rectifier 34 presents a low impedance to such a signal, but passes through the resistor 36 if a decrease is required as, in this case, the rectifier 34 presents a high impedance to the signal.

This anticipates any change of fuel flow called for by the computer C due to a change of speed of the engine and assists in maintaining the speed of the engine particularly when a quick change of pitch is called for. The shunted rectifier 34 ensures a full response if the engine speed is tending to fall and a lesser response if the engine speed is tending to rise, as it is of greater importance not to let the engine speed fall below datum than to rise slightly above datum in such conditions.

The signal from the coil 26 is of such strength that losses in the rectifier 28 are negligible in proportion, and the potential divider 32 is used to provide a signal of the required level.

In some rotor-driving engine control systems, if power is plotted against engine speed, there is found to be a speed droop, possibly of as much as 4%. In such a system, the arrangement described above may be modified by adding a resistor 42 (shown dotted) across the capacitor 38. By this means there is added to the control winding 40 a proportional term signal which is a function of the position of the lever CL. By suitable choice of components, this signal can be made to offset the droop in the system referred to above.

It will be appreciated that the rate term signal may be fed into any convenient part of the magnetic amplifier governor circuit. Thus it may be taken to a pair of control windings in a pair of matched magnetic amplifiers. It may also be derived in other ways than by the use of a variable mutual inductance circuit and capacitor. The proportional term signal need not be fed into the same control winding as the rate term signal.

One example of an alternative to the variable mutual inductance circuit is a variable potential divider.

In this case, the lever CL would be coupled to an arm carrying a movable contact riding on the surface of an annular coil across which a D.C. potential is applied and which constitutes the variable potential divider. The contact would be capacitatively coupled through a capacitor to the control winding 40 in the magnetic amplifier in the governor circuit of the computer C.

I claim:

1. A fuel control system for an engine connected to drive a variable power consuming device comprising speed setting means for selecting engine speed, signal means operable to produce an electric control signal as a function of engine speed, the selected engine speed and changes in selected engine speed, fuel flow control means responsive to said electric control signal to control the magnitude and rate of change of magnitude of fuel flow to said engine, a manually operable member adjustable to vary the power consumption of said device independently of speed setting means and means responsive to adjustment of said manually operable member to modify said electric control signal as a function of the rate of adjustment of said manually operable member, independently of engine speed and selected engine speed, in the sense to anticipate variations in engine speed resulting from variations in the power consumption of said device.

2. A fuel control system as claimed in claim 1, wherein the manually operable member is angularly movable.

3. A fuel control system as claimed in claim 2, wherein the manually operable member is connected to control the output from a circuit energised from a source of electric power, the output being capacitatively coupled to the signal means.

4. A fuel control system as claimed in claim 3, wherein said circuit includes two inductively coupled inductors, one of which is energised from a source of alternating current, and a bridge rectifier, and the manually operable member is connected to vary the mutual inductance of the inductors.

5. A fuel control system as claimed in claim 1, wherein the manually operable member is connected to control the output from a circuit energised from a source of electric power, the output being capacitatively coupled to the signal means.

6. A fuel control system as claimed in claim 5, wherein said circuit includes two inductively coupled inductors, one of which is energised from a source of alternating current, and a bridge rectifier, and the manually operable member is connected to vary the mutual inductance of the inductors.

7. A fuel control system as claimed in claim 6, wherein the output of the bridge rectifier is connected through a shunted rectifier to the capacitor.

8. A fuel control system as claimed in claim 6, wherein the output of the bridge rectifier is connected through a fixed potential divider to the capacitor.

9. A fuel control system as claimed in claim 6, wherein said output is resistively coupled to the signal means.

10. A fuel control system as claimed in claim 9, wherein said output is connected through a capacitor, shunted by a resistor, to a control winding of a magnetic amplifier in said signal means.

11. A fuel control system as claimed in claim 5, wherein said output is resistively coupled to the signal means.

12. A fuel control system as claimed in claim 11, wherein said output is connected through a capacitor, shunted by a resistor, to a control winding of a magnetic amplifier in said signal means.

13. A fuel control system for a gas turbine engine having a compressor turbine and a free turbine and connected to drive the blade carrying rotor of a helicopter comprising a valve for controlling the flow of fuel to the engine, an actuator for varying the setting of said valve, speed setting means for selecting the engine speed, first means associated with said speed setting means to derive a first signal representing the selected engine speed, second means associated with said actuator motor to derive a second signal representing the angular position of said actuator motor and hence the setting of said valve, third means associated with said actuator motor to derive a third signal representing the rate of operation of said motor and hence the rate of change of the setting of said valve, fourth means associated with said compressor turbine to derive a fourth signal representing the speed of rotation of said compressor turbine, fifth means associated with said free turbine to derive a fifth signal representing the speed of rotation of said free turbine, temperature responsive means associated with said engine to derive a sixth signal representing engine temperature, signal means responsive to said first, second, third, fourth, fifth and sixth signals to derive an electric control signal as a function of said first, second, third, fourth, fifth and sixth signals, a member manually operable independently of said speed setting means to vary the pitch of said blades and means responsive to any change in the pitch of said blades to modify said electric control signal as a function of such pitch change independently of said first, second, third, fourth, fifth and sixth signals in the sense to anticipate change in any one of said first, second, third, fourth, fifth and sixth signals resulting from said pitch change.

14. A fuel control system for an engine connected to drive a variable load, said system comprising speed setting means for selecting engine speed, signal means operable to produce an electric control signal as a function of actual engine speed and of the selected engine speed and of changes in the selected engine speed, fuel flow control means responsive to said electric control signal to control the magnitude and the rate of change of magnitude of the fuel flow to said engine, load-varying means adjustable independently of said speed setting means to vary the magnitude of said load, modifying means associated with said load-varying means and responsive to adjustment of said load-varying means to modify said electric control signal as a function of load variation resulting from adjustment of said load-varying means independently of said actual engine speed and said selected engine speed in the sense to anticipate variations in said actual engine speed resulting from variations in said load, said modifying means including a member displaceable by said load-varying means, an alternating-current source, an electric circuit including two inductively coupled inductors of which inductors one is energised from said source and the other is displaceable with said displaceable member to vary the mutual inductance of said inductors as a function of the displacement of said displaceable member, said circuit also including a bridge rectifier to derive a rectified output, and said circuit also including a parallel combination of a rectifier and a resistor both arranged to supply said rectified output to said signal means.

15. A fuel control system for an engine connected to drive a variable load, said system comprising speed setting means for selecting engine speed, signal means operable to produce an electric control signal as a function of actual engine speed and of the selected engine speed and of changes in the selected engine speed, fuel flow control means responsive to said electric control signal to control the magnitude and the rate of change of magnitude of the fuel flow to said engine, load-varying means adjustable independently of said speed setting means to vary the magnitude of said load, modifying means associated with said load-varying means and responsive to adjustment of said load-varying means to modify said electric control signal as a function of load variation resulting from adjustment of said load-varying means independently of said actual engine speed and said selected engine speed in the sense to anticipate variations in said actual engine speed resulting from variations in said load, said modifying means including a member displaceable by said load-varying means, a source of electric power, an electric circuit supplied with power from said source, means for controlling the output of said circuit as a function of the displacement of said displaceable member, and circuit means for applying said controlled output to said signal means, said circuit means including a capacitor to derive a modifying signal as a function of the rate of displacement of said displaceable member.

16. A fuel control system according to claim 15 including a resistor connected across said capacitor to derive a modifying signal which has a component proportional to the magnitude of displacement of the displaceable member and a component which is a function of the rate of displacement of the displaceable member.

17. A fuel control system according to claim 15 wherein said signal means includes a magnetic amplifier having a control winding and said modifying signal is applied to said control winding.

References Cited by the Examiner
UNITED STATES PATENTS

| 2,646,847 | 7/53 | Haworth | 170—135.74 |
| 2,786,330 | 3/57 | Brandau | 60—39.28 |
| 2,829,722 | 4/58 | Best | 170—135.74 |
| 2,832,017 | 4/58 | Evans | 60—39.28 |
| 2,941,601 | 6/60 | Best | 60—39.28 |
| 3,034,583 | 5/62 | Best | 170—135.74 |
| 3,056,455 | 10/62 | Wente | 170—135.74 |
| 3,095,701 | 7/63 | Grosselfinger | 60—39.28 |

FOREIGN PATENTS 586,478  11/59  Canada.

SAMUEL LEVINE, *Primary Examiner.*